US009341895B2

(12) United States Patent
Seong et al.

(10) Patent No.: US 9,341,895 B2
(45) Date of Patent: May 17, 2016

(54) LIQUID CRYSTAL DISPLAY AND METHOD OF MANUFACTURING THE SAME (75) Inventors: Dong Gi Seong, Seongnam-si (KR); Hee Hwan Lee, Seoul (KR); Min-Jae Kim, Suwon-si (KR); Min-Hee Kim, Ansan-si (KR); Keun Chan Oh, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 552 days.

(21) Appl. No.: 13/531,350

(22) Filed: Jun. 22, 2012

(65) Prior Publication Data
US 2013/0229607 A1 Sep. 5, 2013

(30) Foreign Application Priority Data

Mar. 5, 2012 (KR) ........................ 10-2012-0022387

(51) Int. Cl.
*G02F 1/1337* (2006.01)
*G02F 1/1343* (2006.01)

(52) U.S. Cl.
CPC ........ *G02F 1/1337* (2013.01); *G02F 1/133707* (2013.01); *G02F 1/134336* (2013.01); *G02F 1/133784* (2013.01); *G02F 2001/133742* (2013.01); *G02F 2001/133776* (2013.01)

(58) Field of Classification Search
CPC .................... G02F 1/133707; G02F 1/1393
USPC .................................... 349/130, 129
See application file for complete search history.

(56) References Cited

U.S. PATENT DOCUMENTS

| | | | | |
|---|---|---|---|---|
| 3,955,881 | A * | 5/1976 | Yaguchi et al. | 349/126 |
| 7,764,345 | B2 * | 7/2010 | Kosugi et al. | 349/129 |
| 2007/0229744 | A1* | 10/2007 | Yamaguchi et al. | 349/129 |
| 2007/0247559 | A1* | 10/2007 | Tasaka et al. | 349/46 |
| 2009/0213320 | A1* | 8/2009 | Son et al. | 349/191 |
| 2010/0271581 | A1* | 10/2010 | Lyu | 349/130 |
| 2012/0050641 | A1* | 3/2012 | Chen et al. | 349/61 |

FOREIGN PATENT DOCUMENTS

KR 10-2007-0065075 A 6/2007

* cited by examiner

*Primary Examiner* — Thanh-Nhan P Nguyen
(74) *Attorney, Agent, or Firm* — F. Chau & Associates, LLC (57) ABSTRACT A liquid crystal display includes a first substrate and a second substrate facing each other, a plurality of first electrodes on the first substrate, a first vertical alignment layer on the first electrodes, a second electrode on the second substrate, a second vertical alignment layer on the second electrode, and a liquid crystal layer between the first substrate and the second substrate, wherein the liquid crystal layer includes liquid crystal molecules having negative dielectric anisotropy, a chiral dopant, and an alignment aiding agent.

19 Claims, 13 Drawing Sheets

LIQUID CRYSTAL DISPLAY AND METHOD OF MANUFACTURING THE SAME

CROSS-REFERENCE TO RELATED APPLICATION

This application claims priority to Korean Patent Application No. 10-2012-0022387 filed in the Korean Intellectual Property Office on Mar. 5, 2012, the disclosure of which is herein incorporated by reference.

TECHNICAL FIELD

Embodiments of the present invention relate to a liquid crystal display and a method of manufacturing the same.

DISCUSSION OF THE RELATED ART

A liquid crystal display includes two display panels with field generating electrodes, such as pixel electrodes and a common electrode, and a liquid crystal layer between the display panels. A voltage is applied to the field generating electrodes to generate an electric field in the liquid crystal layer, which determines the direction of liquid crystal molecules of the liquid crystal layer and controls the polarization of incident light, thereby displaying images.

Liquid crystal displays may be operated in various modes, such as, for example, a vertical alignment (VA) mode, a twisted nematic (TN) mode, or an in-plane switching (IPS) mode.

In the vertical alignment (VA) mode, in the state that the electric field is not applied to the liquid crystal layer having a negative dielectric ratio, long axes the liquid crystal molecules are arranged vertical to the upper and lower display panels and the vertical electric field is applied to the liquid crystal layer.

In the twisted nematic mode, the liquid crystal molecules are aligned to be parallel to the panels and are spirally twisted with a predetermined pitch from one panel to the other panel in the absence of an electric field, thereby forming a twisted structure, such that the arrangement orientation of the long axes is continuously changed. When the electric field is generated between the electrodes formed in the two display panels, the twisted nematic mode liquid crystal display aligns the LC molecules in parallel to the field direction, i.e., about perpendicular to the two panels. In the in-plane switching (IPS) mode, the electric field having a direction approximately horizontal to the display panel is applied to the liquid crystal layer having a positive dielectric ratio, and the axes of the liquid crystal molecules are arranged to be parallel to the horizontal electric field.

SUMMARY

Embodiments of the present invention provide a liquid crystal display with a simplified structure, which can provide a wider viewing angle, higher transmittance, a higher contrast ratio, and a faster response.

A liquid crystal display according to an exemplary embodiment of the present invention includes a first substrate and a second substrate facing each other, a plurality of first electrodes positioned on the first substrate, a first vertical alignment layer positioned on the first electrode, a second electrode positioned on the second substrate, a second vertical alignment layer positioned on the second electrode, and a liquid crystal layer positioned between the first substrate and the second substrate, wherein the liquid crystal layer includes liquid crystal molecules having negative dielectric anisotropy, a chiral dopant, and an alignment aiding agent so that the liquid crystal molecules may be arranged to be substantially perpendicular to surfaces of the first substrate and the second substrate when no electric field is generated in the liquid crystal layer and may be arranged to be twisted by the chiral dopant when an electric field is generated in the liquid crystal layer.

The alignment aiding agent may include at least one of a surface alignment aiding agent connected to the first vertical alignment layer and an internal alignment aiding agent that is not connected to the first vertical alignment layer nor the second vertical alignment layer.

At least one of the first vertical alignment layer or the second vertical alignment layer may be rubbed.

A rubbing direction of the first vertical alignment layer may cross a rubbing direction of the second vertical alignment layer.

At least one of the plurality of first electrodes may have a cutout pattern including at least one edge.

The cutout pattern may be symmetrical with respect to a transverse center line or a longitudinal center line of the first electrodes.

A method of manufacturing a liquid crystal display according to an exemplary embodiment of the present invention includes providing a first substrate having a plurality of first electrodes and a second substrate including a second electrode, forming a first vertical alignment layer on the first electrodes and forming a second vertical alignment layer on the second electrode, forming a liquid crystal layer between the first and second substrates, the liquid crystal layer including liquid crystal molecules, a chiral dopant, and a prepolymer, applying a voltage difference between the first electrode and the second electrode to generate an electric field in the liquid crystal layer, and irradiating light to the liquid crystal layer while the electric field is generated to the liquid crystal layer to polymerize the prepolymer, wherein the liquid crystal molecules are arranged to be substantially perpendicular to surfaces of the first substrate and the second substrate when the electric field is not generated in the liquid crystal layer and are arranged to be twisted by the chiral dopant when the electric field is generated in the liquid crystal layer.

The prepolymer may include at least one of a prepolymer connected to the first vertical alignment layer and a prepolymer that is not connected to the first vertical alignment layer nor the second vertical alignment layer.

The prepolymer may include a reactive mesogen.

The method may further include rubbing at least one of the first vertical alignment layer or the second vertical alignment layer after forming the first vertical alignment layer and the second vertical alignment layer.

At least one of the plurality of first electrodes may have a cutout pattern including at least one edge.

Rubbing at least one of the first vertical alignment layer or the second vertical alignment layer may be performed after the first vertical alignment layer and the second vertical alignment layer are formed.

A weight ratio of the prepolymer to the liquid crystal layer may be in a range from about 0.1 wt % to about 1.0 wt %.

DETAILED DESCRIPTION OF THE EMBODIMENTS

Hereinafter, embodiments of the present invention will be described in detail with reference to the accompanying drawings. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like or similar elements throughout the specification and the drawings. It will be understood that when an element such as a layer, film, region, or substrate is referred to as being "on" another element, it can be directly on the other element or intervening elements may also be present.

As will be appreciated by one skilled in the art, embodiments of the present invention may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Figure 1:
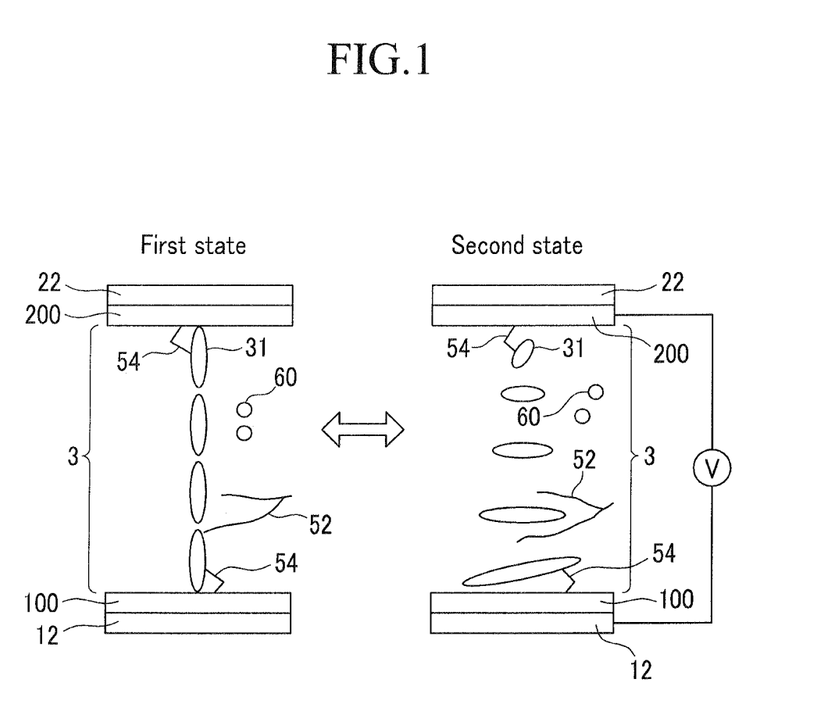
FIG. 1 is a cross-sectional view illustrating a liquid crystal display according to an exemplary embodiment of the present invention.

FIG. 1 is a cross-sectional view illustrating a liquid crystal display according to an exemplary embodiment of the present invention.

Referring to FIG. 1, a liquid crystal display according to an exemplary embodiment of the present invention includes a lower panel 100 and an upper panel 200, two polarizers 12 and 22 respectively attached to outer surfaces of the two display panels 100 and 200, and a liquid crystal layer 3 interposed between the two display panels 100 and 200.

The lower panel 100 and the upper panel 200 respectively include two field generating electrodes (not shown) that face each other and that form a vertical electric field in the liquid crystal layer 3.

Two transmissive axes of the two polarizers 12 and 22 are parallel or substantially parallel or perpendicular or substantially perpendicular to each other according to a display mode of the liquid crystal display.

The liquid crystal layer 3 includes a plurality of liquid crystal molecules 31, a chiral dopant 60, an internal alignment aiding agent 52, and a surface alignment aiding agent 54.

The liquid crystal molecules 31 have negative dielectric anisotropy and have a characteristic that a long axis tends to incline in a direction perpendicular or substantially perpendicular to the electric field generated in the liquid crystal layer 3.

The liquid crystal molecules 31 are arranged such that their long axes are aligned perpendicular or approximately perpendicular to the surface of the two display panels 100 and 200 in a first state in which no electric field is generated in the liquid crystal layer 3. In a second state in which an electric field is generated in the liquid crystal layer 3, the liquid crystal molecules 31 are arranged such that their long axes are aligned in a direction approximately parallel to the surface of the two display panels 100 and 200.

In the first state, an initial alignment of the liquid crystal molecules 31 is determined by a vertical alignment layer (not shown) positioned inside the two display panels 100 and 200. The alignment layer includes a main chain and a side chain. The main chain of the alignment layer makes the liquid crystal molecules 31 aligned vertical to the surface of the display panels 100 and 200 in the first state.

In the second state, the liquid crystal molecules 31 have a twist structure according to a helical characteristic of the chiral dopant 60. In other words, in the second state, the liquid crystal molecules 31 are spirally twisted from one of the display panel 100 and 200 to the other one of the display panel 100 and 200, and this arrangement structure of the liquid crystal molecules 31 is similar to the initial alignment structure in the twisted nematic mode. According to an embodiment, the chiral dopant 60 includes octylhexyloxybenzoyloxybenzoate or pentylphenylbiphenylcarboxylate, or an antipode dopant, however it is not limited thereto.

When the transmissive axes of the polarizers 12 and 22 cross each other, in the first state shown in FIG. 1, black is displayed, and in the second state, white is displayed. This situation is referred to as a normally black mode. Different from the normally black mode, when the transmissive axes of the polarizers 12 and 22 are parallel to each other, in the first state shown in FIG. 1, white is displayed, and in the second state, black is displayed. This situation is referred to as a normally white mode.

The surface alignment aiding agent 54 is connected to the alignment layer thereby forming the side-chain of the alignment layer, and has negative dielectric anisotropy. The internal alignment aiding agent 52 is not connected to the alignment layer and is positioned inside the liquid crystal layer 3.

The internal alignment aiding agent 52 and the surface alignment aiding agent 54 include a polymer, such as a mesogen of which a prepolymer, such as a reactive mesogen, is hardened and polymerized by light such as ultraviolet rays. According to an embodiment, a weight ratio of the prepolymer to the entire liquid crystal material forming the liquid crystal layer 3 is in a range from about 0.1 wt % to about 1.0 wt %.

The internal alignment aiding agent 52 and the surface alignment aiding agent 54 previously determine an inclination direction of the liquid crystal molecules 31 when the liquid crystal molecules 31 are inclined in the direction parallel to the surface of the two display panels 100 and 200 in the second state. The liquid crystal molecules 31 are pre-tilted in the inclination direction by the internal alignment aiding agent 52 or the surface alignment aiding agent 54 in the first state.

When the liquid crystal molecules are changed from the first state to the second state, the inclination direction of the liquid crystal molecules 31, e.g., an initial movement direction of the liquid crystal molecules 31, is determined by the internal alignment aiding agent 52 or the surface alignment aiding agent 54 such that the response speed at which the liquid crystal molecules 31 are changed to the second state can increase.

When the liquid crystal layer 3 does not include the internal alignment aiding agent 52 or the surface alignment aiding agent 54, the liquid crystal molecules 31 are slanted in an arbitrary horizontal direction (e.g., a direction parallel to the surface of the display panels) when the liquid crystal molecules 31 are changed from the first state to the second state and are then rotated on the horizontal surface parallel to the display panels 100 and 200 by the chiral dopant 60 such that the response speed of the liquid crystal molecules 31 is slow.

According to an embodiment, one of the internal alignment aiding agent 52 or the surface alignment aiding agent 54 is omitted.

The liquid crystal molecules 31 of the liquid crystal layer 3 of the liquid crystal display according to an exemplary embodiment of the present invention are arranged vertical to the display panel 100 and 200 in the absence of the electric field generated in the liquid crystal layer 3 and are arranged in the twisted state when an electric field is generated in the liquid crystal layer 3, and the initial movement direction of the liquid crystal molecules 31 is determined by the alignment aiding agent that is positioned inside the liquid crystal layer 3 or connected to the alignment layer. Accordingly, the liquid crystal display according to an exemplary embodiment of the present invention has a high contrast ratio in the case of the normally black mode like in the general vertical alignment (VA) mode, so it is not necessary to form a complicated pattern on the field generating electrode like in the general twisted nematic mode, thereby resulting in savings in the manufacturing cost, an increase in the transmittance, low driving voltage, and implementation of a wide viewing angle.

Further, in the normally black mode of the liquid crystal display according to an exemplary embodiment of the present invention, the second state represents a high gray level such that a low gray inversion is not generated at a lower side of the liquid crystal display. The alignment aiding agent is included in the liquid crystal layer 3 or connected to the alignment layer, so that the liquid crystal molecules 31 are pre-tilted, thus increasing the response speed.

Accordingly, the liquid crystal display according to an exemplary embodiment of the present invention has excellent driving and displaying characteristics compared with any conventional liquid crystal displays.

Figure 2:
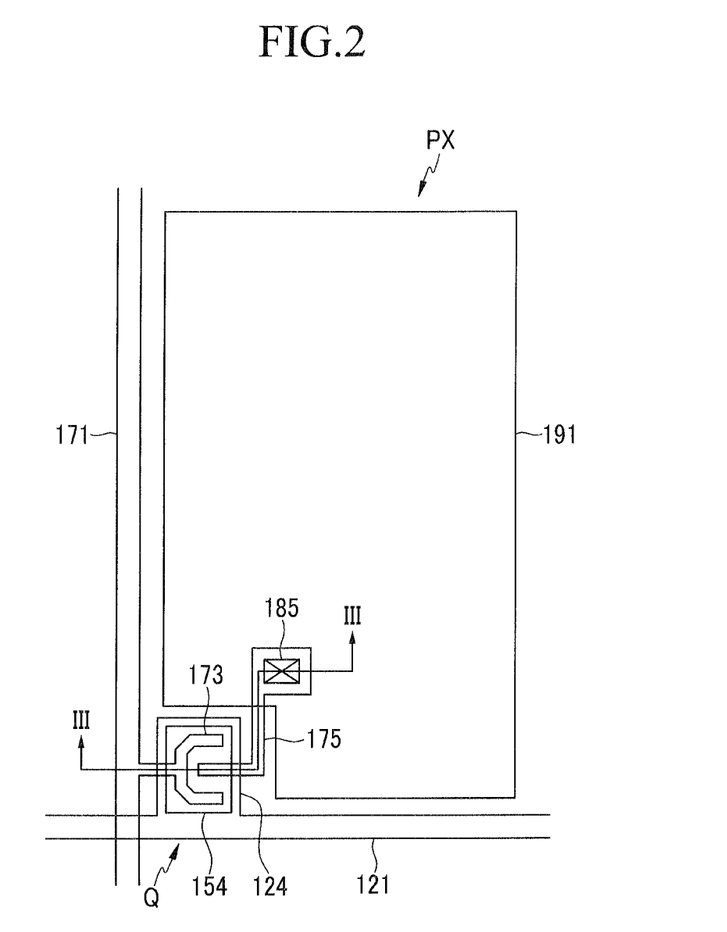
FIG. 2 is a layout view illustrating a pixel of a liquid crystal display according to an exemplary embodiment of the present invention.
Figure 3:
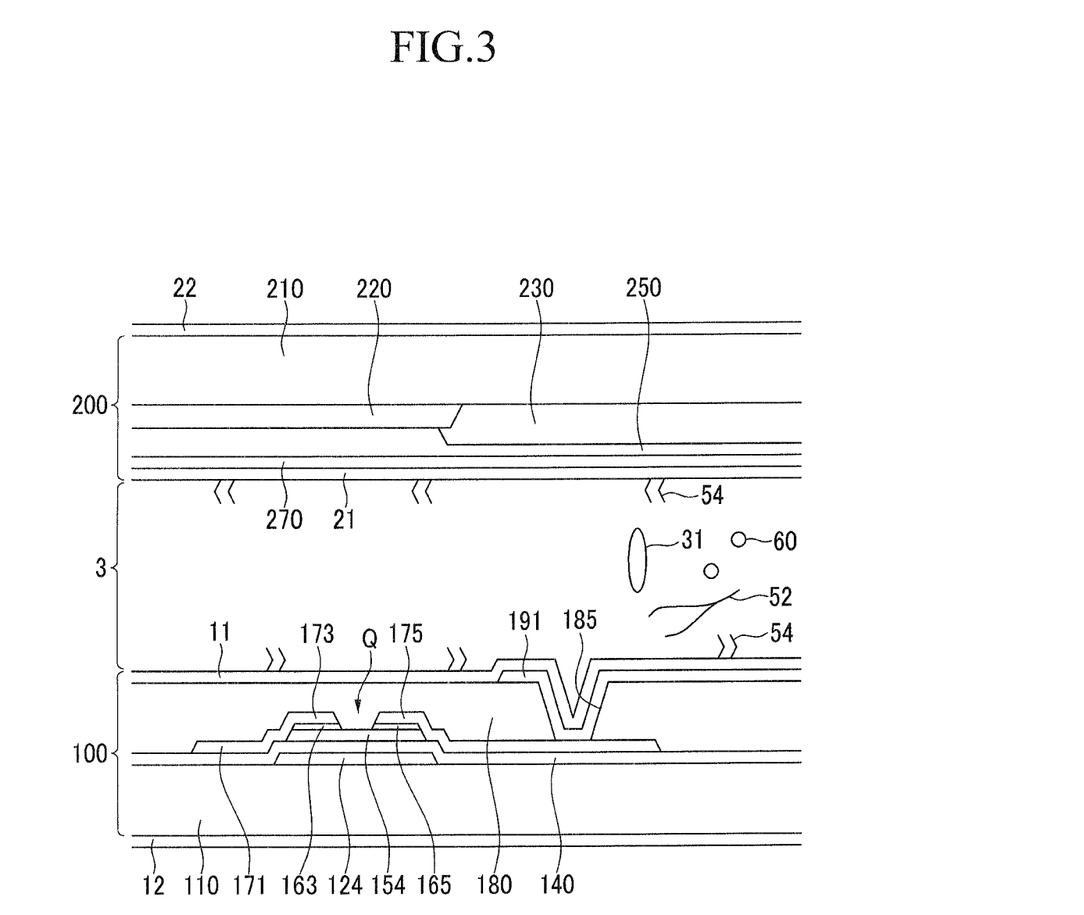
FIG. 3 is a cross-sectional view of the liquid crystal display of FIG. 2 taken along the line III-III.

Referring to FIG. 2 and FIG. 3, a detailed structure of the liquid crystal display shown in FIG. 1 is described.

FIG. 2 is a layout view illustrating a pixel PX of a liquid crystal display according to an exemplary embodiment of the present invention, and FIG. 3 is a cross-sectional view of the liquid crystal display of FIG. 2 taken along the line III-III.

The liquid crystal display according to an exemplary embodiment of the present invention includes the lower panel 100 and the upper panel 200 facing each other, the liquid crystal layer 3 interposed between the two display panels 100 and 200, and the polarizers 12 and 22 attached to the outer surfaces of the two display panels 100 and 200, respectively.

A plurality of gate lines 121 respectively including gate electrodes 124 are formed on an insulating substrate 110. The gate lines 121 transmit gate signals.

A gate insulating layer 140 is formed on the gate lines 121, and a plurality of semiconductor layers 154 made of, e.g., hydrogenated amorphous silicon or polysilicon are formed on the gate insulating layer 140.

A plurality of pairs of ohmic contact islands 163 and 165 are formed on the semiconductor layers 154. The ohmic contact islands 163 and 165 are made of, e.g., n+ hydrogenated a-Si heavily doped with an N-type impurity, such as phosphorous, or the ohmic contact islands 163 and 165 are made of a silicide.

A plurality of data lines 171 and a plurality of drain electrodes 175 are formed on the ohmic contacts 163 and 165 and the gate insulating layer 140. The data lines 171 transmit data voltages and substantially intersect the gate lines 121. The data lines 171 include a plurality of source electrodes 173 extending toward the gate electrodes 124. Each drain electrode 175 faces a corresponding one of the source electrodes 173 with respect to a corresponding one of the gate electrodes 124.

The gate electrode 124, the source electrode 173, and the drain electrode 175 form a thin film transistor (TFT) Q along with the semiconductor layer 154.

A passivation layer 180 made of e.g., an organic insulating material or an inorganic insulating material is formed on the data lines 171, the drain electrodes 175, and the exposed semiconductor layer 154. The passivation layer 180 includes a plurality of contact holes 185 exposing the drain electrodes 175.

A plurality of pixel electrodes 191 made of, e.g., a transparent conductive material, such as indium tin oxide (ITO) or indium zinc oxide (IZO), or a reflective metal such as aluminum, silver, chromium, or an alloy thereof, are formed on the passivation layer 180. Each pixel electrode 191 is connected to a corresponding one of the drain electrodes 175 through a corresponding one of the contact holes 185 thereby receiving a data voltage from the drain electrode 175. At least one pixel electrode 191 is formed for one pixel PX.

A light blocking member 220 and a plurality of color filters 230 are formed on an insulation substrate 210.

An overcoat 250 is formed on the color filters 230 and the light blocking member 220, and an opposed electrode 270 facing the pixel electrode 191 is formed on the overcoat 250 over the entire surface of the substrate.

Alignment layers 11 and 21 are coated on inner surfaces of two display panels 100 and 200, respectively. The characteristics of the alignment layers 11 and 21 are the same or substantially the same as those described above in connection with FIGS. 1 and 2.

The liquid crystal layer 3 and two polarizers 12 and 22 are the same as those described above in connection with FIGS. 1 and 2.

A method of manufacturing a liquid crystal display according to an exemplary embodiment of the present invention is described with reference to FIG. 4, FIG. 5, FIG. 6, and FIG. 7.

FIG. 4, FIG. 5, FIG. 6, and FIG. 7 are views sequentially showing steps of a method of manufacturing a liquid crystal display according to an exemplary embodiment of the present invention.

The lower panel 100 and the upper panel 200 of the liquid crystal display are formed according to various methods.

Figure 4:
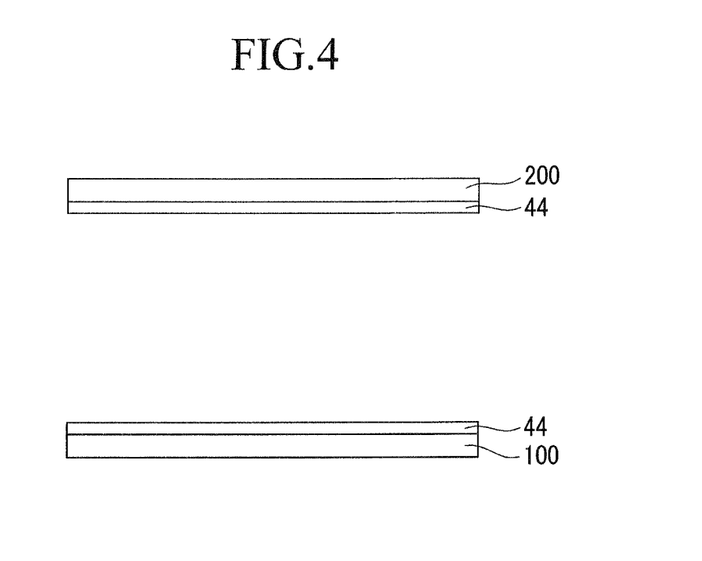
FIG. 4, FIG. 5, FIG. 6, and FIG. 7 are views sequentially showing steps of a method of manufacturing a liquid crystal display according to an exemplary embodiment of the present invention.

According to an embodiment, known methods are used to form the lower and upper panels 100 and 200. According to an embodiment, the vertical alignment layers 11 and 21 are coated on the inner surfaces of the lower panel 100 and the upper panel 200.

Referring to FIG. 4, a prepolymer layer 44 including a prepolymer, such as a reactive mesogen, is formed on the inner surfaces of the lower panel 100 and the upper panel 200, which face each other.

Figure 5:
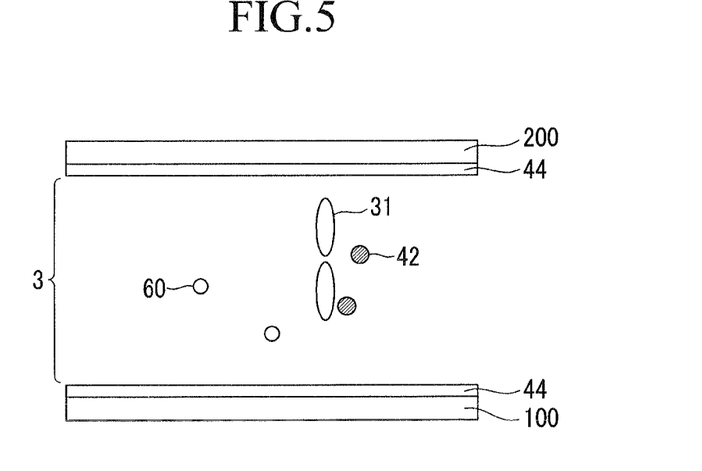

Referring to FIG. 5, the two display panels 100 and 200 are combined and a liquid crystal material including the liquid crystal molecules 31 is injected between the panels 100 and 200 to form a liquid crystal layer 3. The liquid crystal material includes a chiral dopant 60 and a prepolymer 42, such as the reactive mesogen, as well as the liquid crystal molecules 31. The liquid crystal molecules 31 are arranged in the direction perpendicular or approximately perpendicular to the surface of the display panels 100 and 200 by the vertical alignment layers 11 and 21.

Alternatively, one of the prepolymer layer 44 and the prepolymer 42 is omitted.

Figure 6:
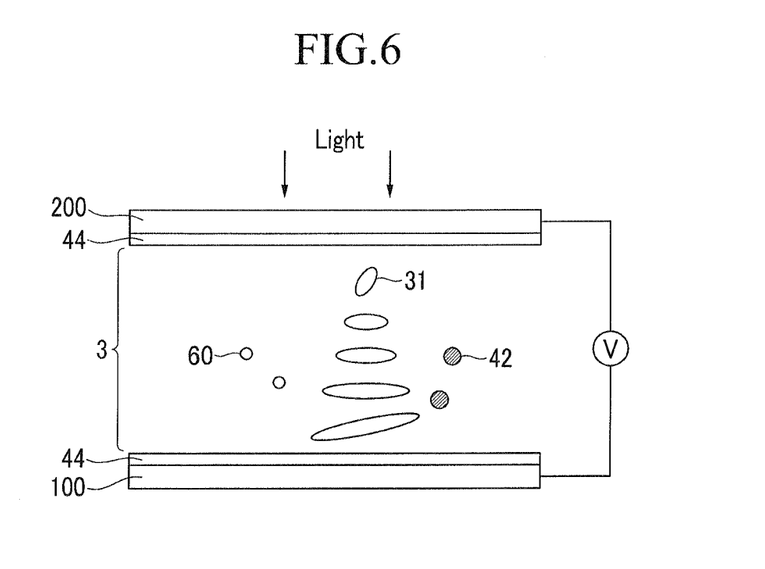

Referring to FIG. 6, a voltage is applied to field generating electrodes of the two display panels 100 and 200 to generate an electric field in the liquid crystal layer 3. Thus, the liquid crystal molecules 31 of the liquid crystal layer 3 are arranged such that the long axes thereof are aligned in the direction perpendicular or substantially perpendicular to the electric field in response to the electric field and are arranged to be twisted by the chiral dopant 60.

Figure 7:
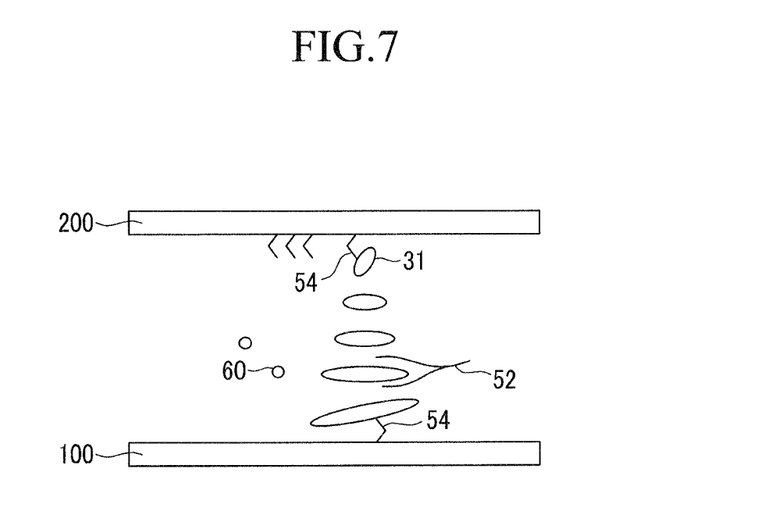

When light, such as ultraviolet rays, is irradiated to the liquid crystal layer 3 in the state that the electric field is generated in the liquid crystal layer 3 to polymerize the prepolymer layer 44 or the prepolymer 42 as shown in FIG. 7, the surface alignment aiding agent 54 connected to the alignment layer of the display panels 100 and 200 and the internal alignment aiding agent 52 inside the liquid crystal layer 3 are formed. The surface alignment aiding agent 54 or the internal alignment aiding agent 52 includes the polymerized mesogen.

The surface alignment aiding agent 54 forms a side chain of the alignment layer such that the liquid crystal molecules 31 adjacent to the surface of the display panels 100 and 200 are pre-tilted although the electric field is stopped from being generated in the liquid crystal layer 3, and the internal alignment aiding agent 52 causes the liquid crystal molecules 31 in the liquid crystal layer 3 to be pre-tilted. Accordingly, when the electric field is generated in the liquid crystal layer 3, the liquid crystal molecules 31 are inclined in the pre-tilted direction without being first arranged to be parallel with the surfaces of the panels 100 and 200, such that the response speed is increased.

After generating the electric field in the liquid crystal layer 3 and irradiating the light, light, such as ultraviolet rays, is again irradiated to the liquid crystal layer 3 while the electric field is not generated in the liquid crystal layer 3 to thereby polymerize the prepolymer layer 44 or the prepolymer 42 remaining unhardened in the liquid crystal layer 3, thus preventing a lowering in reliability due to an additional reaction by the reactive mesogen remaining under the display operation.

Figure 8:
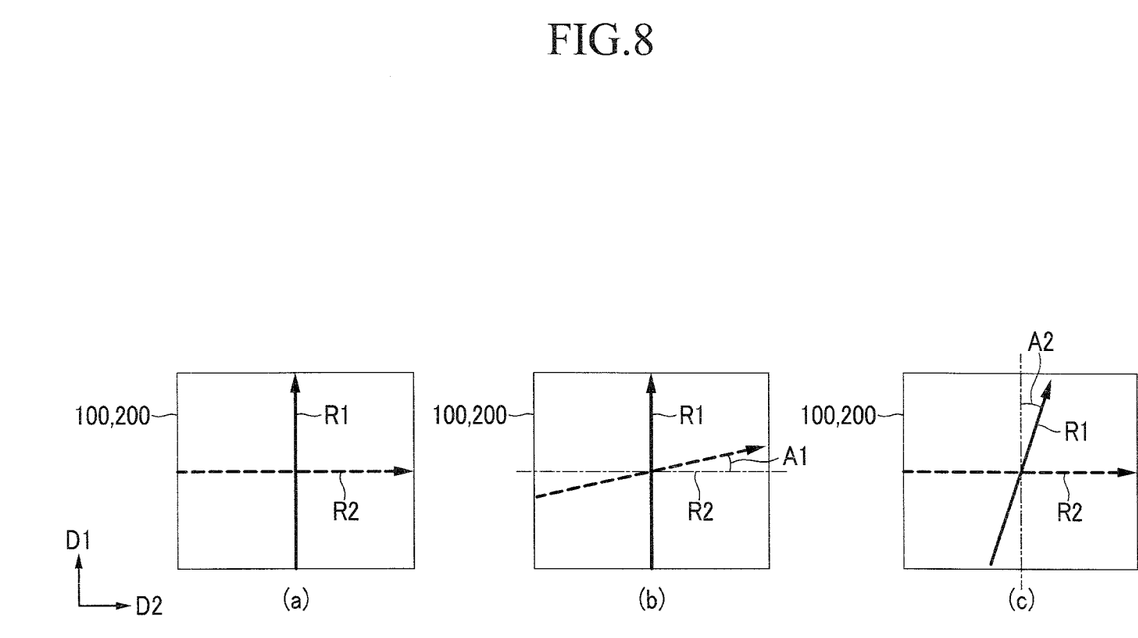
FIG. 8 is a view showing rubbing directions of alignment layers of two display panels of a liquid crystal display according to an exemplary embodiment of the present invention.
Figure 9:
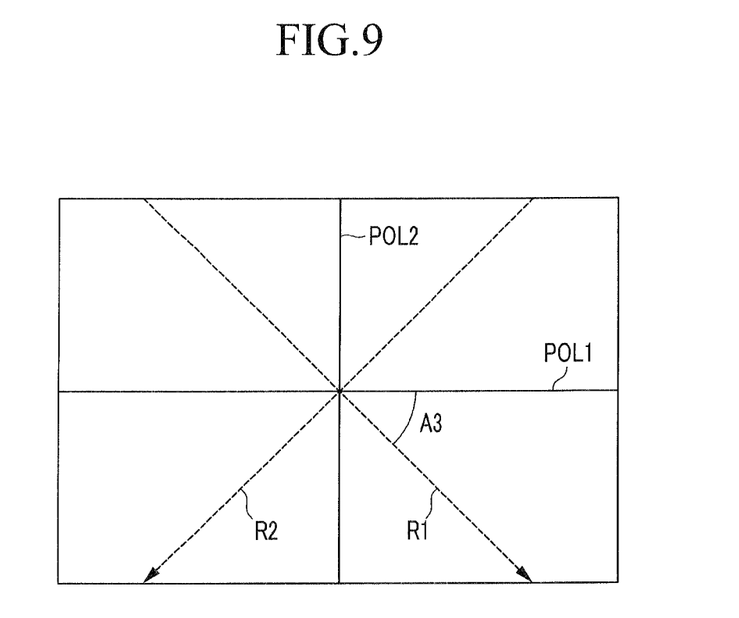
FIG. 9 is a view showing transmissive axis directions of polarizers and rubbing directions of alignment layers in a liquid crystal display according to an exemplary embodiment of the present invention.

FIG. 8 is a view showing rubbing directions of alignment layers of two display panels in a liquid crystal display according to an exemplary embodiment of the present invention, and FIG. 9 is a view showing transmissive axes directions of polarizers and rubbing directions of alignment layers in a liquid crystal display according to an exemplary embodiment of the present invention.

The liquid crystal display according to the present exemplary embodiment is the same or substantially the same as the liquid crystal display described in connection with FIG. 1 to FIG. 3, except that at least one alignment layer is rubbed to further surely define the initial movement direction of the initial liquid crystal molecules 31. In other words, the initial movement direction of the initial liquid crystal molecules 31 determined by the internal alignment aiding agent 52 or the surface alignment aiding agent 54 may be made more noticeable by rubbing the alignment layer.

Referring to FIG. 3 and (a) of FIG. 8, in the second state of FIG. 1, the liquid crystal molecules 31 adjacent to the surfaces of the two display panels 100 and 200 are arranged in directions perpendicular or substantially perpendicular to each other such that a rubbing direction R1 of the alignment layer 11 of the lower panel 100 and a rubbing direction R2 of the alignment layer 21 of the upper panel 200 are perpendicular or substantially perpendicular to each other. When the rubbing direction R1 of the alignment layer 11 of the lower panel 100 is a first direction D1, the rubbing direction R2 of the alignment layer 21 of the upper panel 200 is a second direction D2 perpendicular or substantially perpendicular to the first direction D1.

Alternatively, referring to (b) of FIG. 8, the rubbing direction R1 of the alignment layer 11 of the lower panel 100 is the same or substantially the same as the rubbing direction R1 of (a) of FIG. 8, and the rubbing direction R2 of the alignment layer 21 of the upper panel 200 makes an angle A1 of more than about −20 degrees to less than about 20 degrees with the second direction D2.

Referring to (c) FIG. 8, the rubbing direction R2 of the alignment layer 21 of the upper panel 200 is the same or substantially the same as the rubbing direction R2 of (a) of FIG. 8, and the rubbing direction R1 of the alignment layer 11 of the lower panel 100 makes an angle A2 of more than about −20 degrees to less than about 20 degrees with the first direction D1.

Alternatively, only one of the alignment layer 11 of the lower panel 100 and the alignment layer 21 of the upper panel 200 is rubbed. Then, the initial movement direction of the liquid crystal molecules 31 adjacent to one of the two display panels 100 and 200 is quickly determined, and the remaining liquid crystal molecules 31 are arranged to be twisted by the chiral dopant 60 such that the response speed of the liquid crystal molecule 31 increases.

Referring to FIG. 9, an angle A3 between the rubbing direction R1 of the alignment layer 11 and a transmissive axis direction POL1 of the polarizer 12 or between the rubbing direction R2 of the alignment layer 21 and a transmissive axis direction POL2 of the polarizer 22 is about 45 degrees, but is not limited thereto. As shown in FIG. 9, when the transmissive axis directions POL1 and POL2 of the polarizers 12 and 22 are respectively parallel to the horizontal direction and the vertical direction of the display panels 100 and 200, the manufacturing cost of the polarizers 12 and 22 may be reduced.

FIG. 10, FIG. 11, FIG. 12, FIG. 13, and FIG. 14 are plan views each illustrating a pixel electrode of a liquid crystal display according to exemplary embodiments of the present invention, In FIG. 10 to FIG. 14, a gray portion indicates where a pixel electrode is positioned, and a white portion indicates where the pixel electrode is not positioned.

The liquid crystal display according to the present exemplary embodiments is the same or substantially the same as the liquid crystal display described in connection with FIG. 1 to FIG. 3 except that a simple cutout pattern is formed in the pixel electrode 191 of the lower panel 100 to further surely define the initial movement direction of the initial liquid crystal molecules 31. In other words, the initial movement direction of the initial liquid crystal molecules 31 determined by the internal alignment aiding agent 52 or the surface alignment aiding agent 54 may be made more noticeable by rubbing the alignment layer. The cutout pattern includes at least one edge in addition to a rectangular outer edge of the pixel electrode 191. An arrangement direction of some of the liquid crystal molecules 31 is determined by a fringe electric field generated due to an edge of the cutout pattern. According to the embodiments, the cutout pattern has various shapes as shown in FIG. 10 to FIG. 14.

Figure 10:
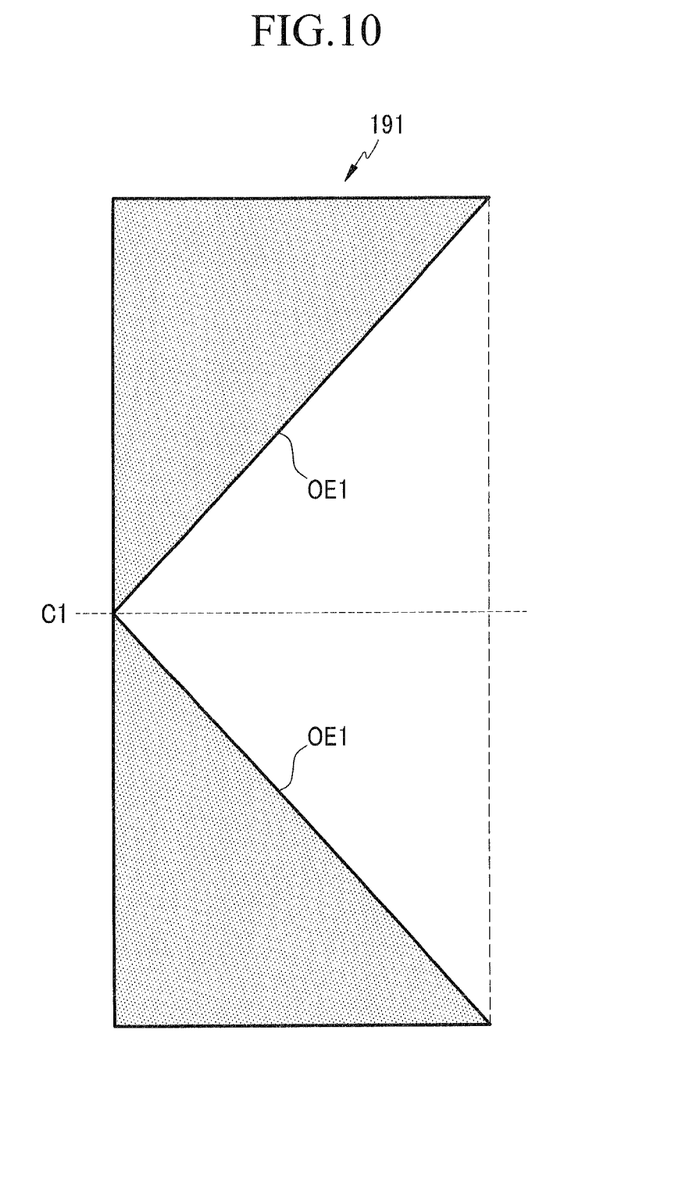
FIG. 10, FIG. 11, FIG. 12, FIG. 13, and FIG. 14 are plan views each illustrating a pixel electrode of a liquid crystal display according to exemplary embodiments of the present invention.

Referring to FIG. 10, the cutout pattern of the pixel electrode 191 according to an exemplary embodiment of the present invention is shaped as a triangle and includes two edges OE1. The two edges OE1 are symmetrical with respect to a transverse center line C1. The transverse center line C1 extends in the direction parallel to the gate line 121 formed in the lower panel 100.

Figure 11:
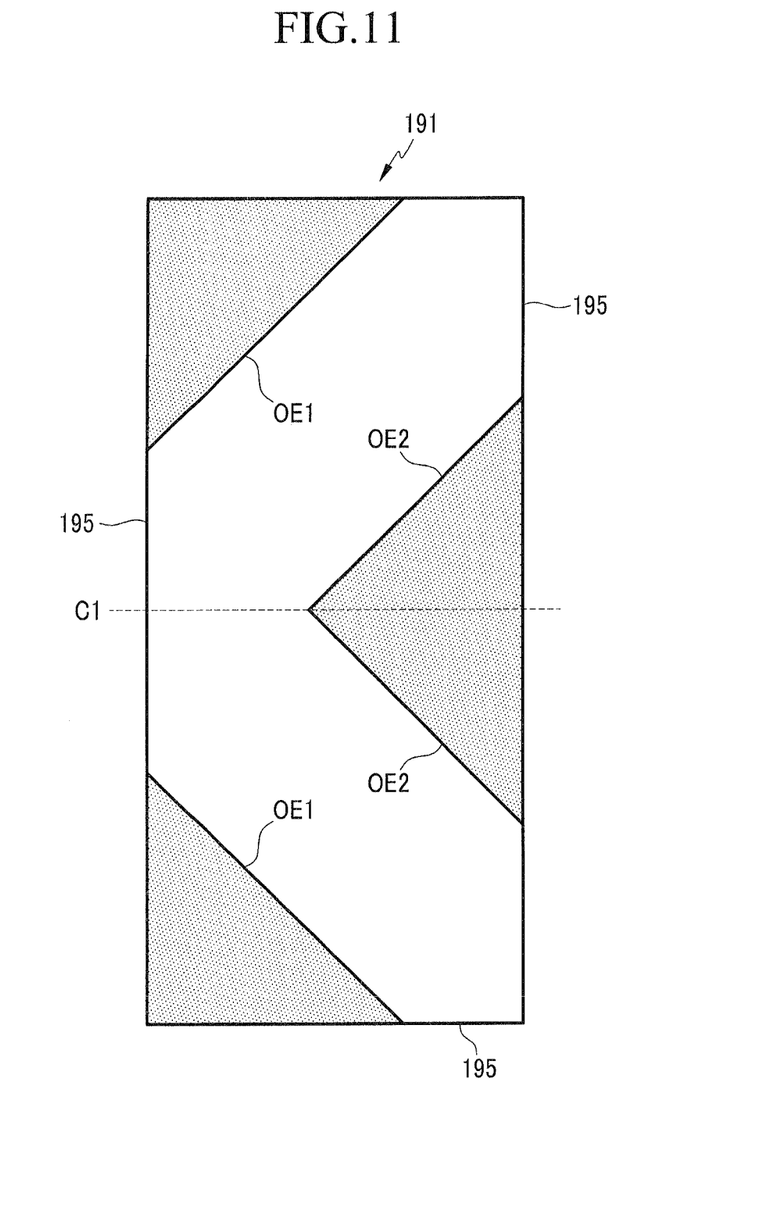

Referring to FIG. 11, the cutout pattern of the pixel electrode 191 according to an exemplary embodiment of the present invention is shaped as an inequality sign (e.g., "<") and includes four edges with two edges OE1 and two edges OE2. The two edges OE1 are symmetrical to each other with respect to the transverse center line C1, and the two edges OE2 are symmetrical to each other with respect to the transverse center line C1. The edges OE1 and OE2 positioned over the transverse center line C1 face each other and extend in parallel to each other, and the edges OE1 and OE2 positioned under the transverse center line C1 face each other and extend in parallel to each other. According to an exemplary embodiment, the pixel electrode 191 is divided by the cutout pattern into electrode portions which are connected to each other.

According to an exemplary embodiment, each of the edges OE1 and OE2 obliquely extends with respect to the transverse center line C1, and an angle between each of the edges OE1 and OE2 and the transverse center line C1 is changed according to a transmissive axis of the polarizer.

Figure 12:
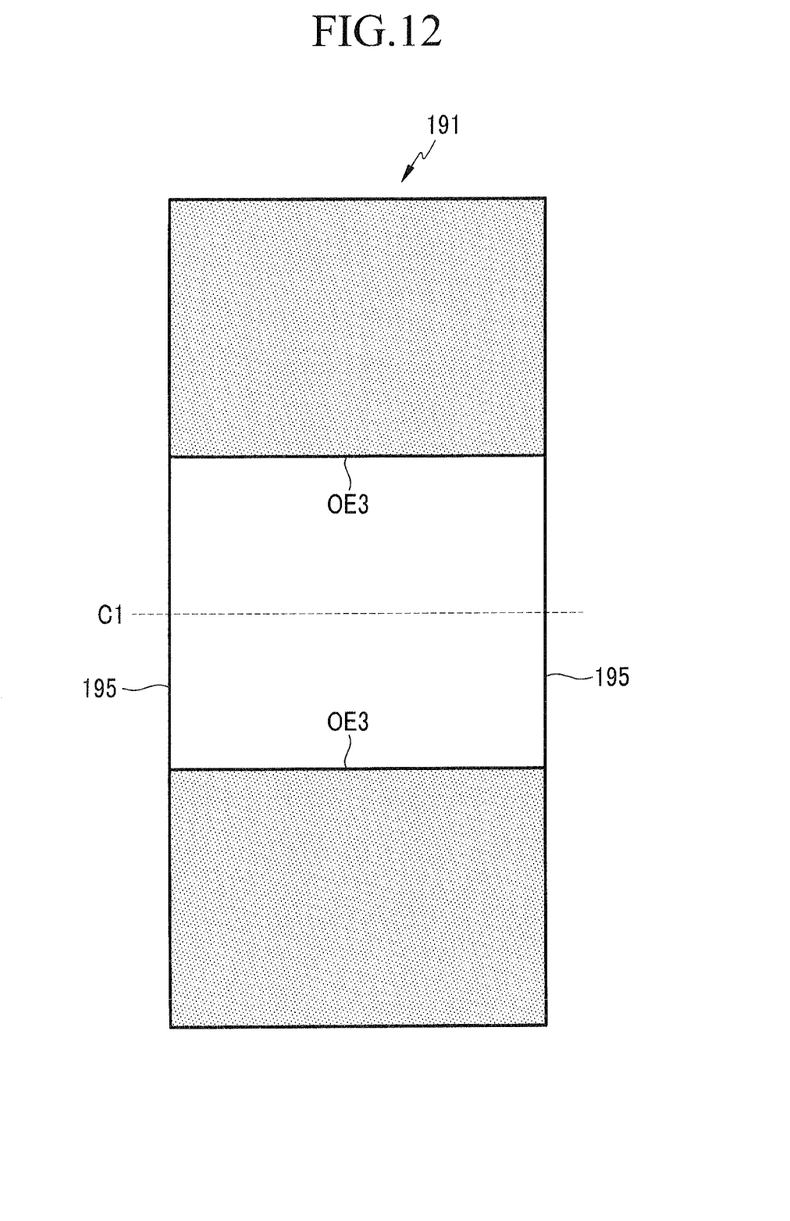

Referring to FIG. 12, the cutout pattern of the pixel electrode 191 according to an exemplary embodiment of the present invention is shaped as a quadrangle. The cutout pattern according to an exemplary embodiment includes two edges OE3 that face each other and that are symmetrical to each other with respect to the transverse center line C1. The two edges OE3 extend in parallel to each other. According to an exemplary embodiment, when the cutout pattern of the quadrangle is positioned in the center of the pixel electrode 191, two electrode portions that are positioned over and under the cutout pattern are connected to each other by a connection 195.

Figure 13:
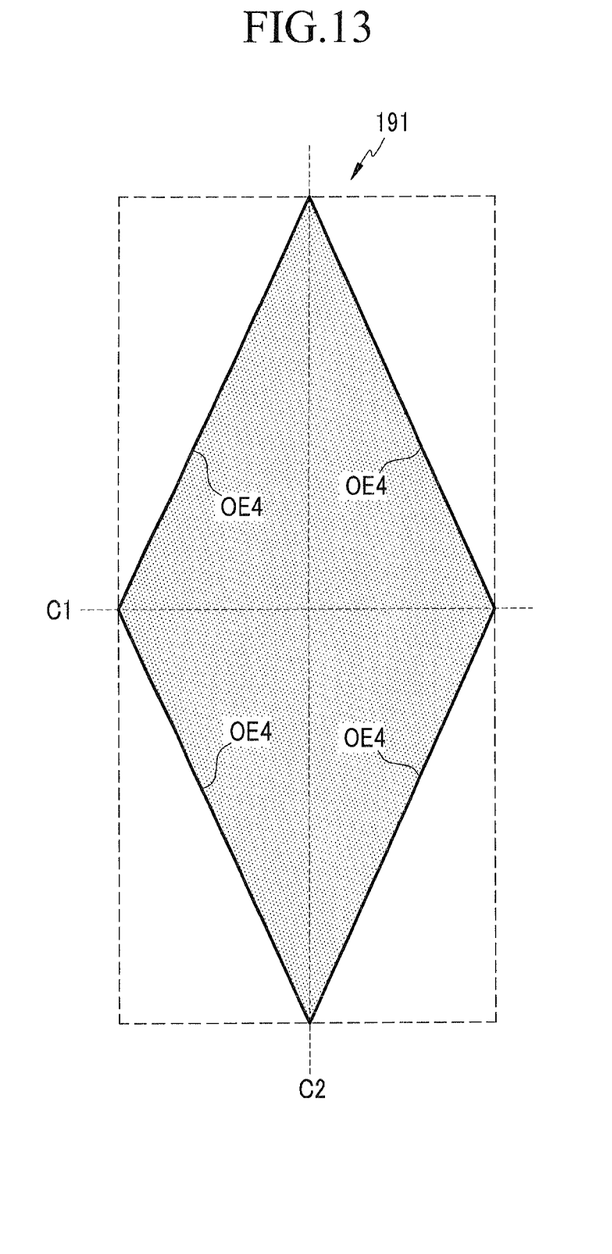

Referring to FIG. 13, the cutout pattern of the pixel electrode 191 according to an exemplary embodiment of the present invention includes a plurality of cutouts divided from each other. According to an exemplary embodiment, the plurality of divided cutouts are respectively shaped as four triangles positioned at four corners of the pixel electrode 191. Two neighboring cutouts of the neighboring cutouts share a vertex. The pixel electrode 191 is shaped as a quadrangle having four edges OE4 that are oblique with respect to the transverse center line C1. The pixel electrode 191 and the cutout patterns are symmetrical with respect to the transverse center line C1 and the longitudinal center line C2.

Figure 14:
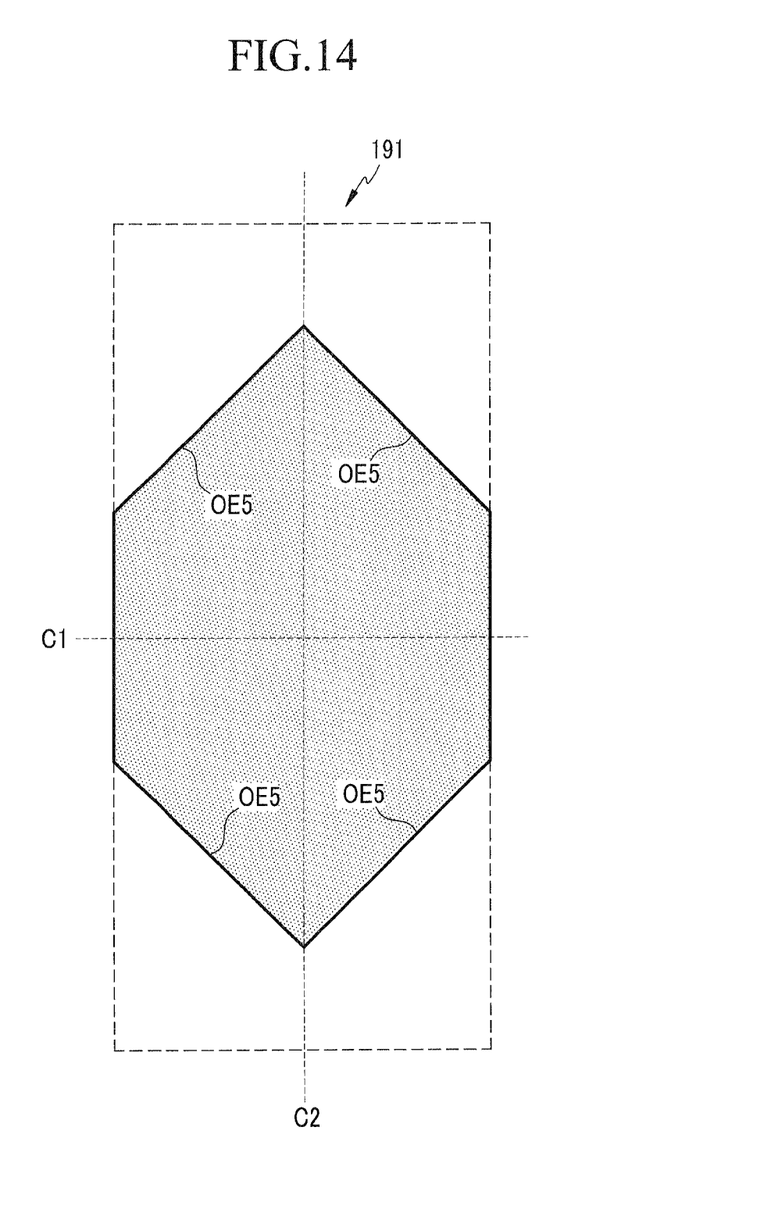

Referring to FIG. 14, the cutout pattern of the pixel electrode 191 according to an exemplary embodiment of the present invention includes a plurality of divided cutouts. According to an exemplary embodiment of FIG. 14, the plurality of divided cutouts are four quadrangles respectively positioned at four corners of the pixel electrode 191. According to an embodiment, the cutouts positioned over the transverse center line C1 are not connected to the cutouts positioned under the transverse center line C1. The neighboring cutouts positioned along the horizontal direction share one edge. According to an embodiment, the pixel electrode 191 is shaped as a hexagon having four edges OE5 that are oblique with respect to the transverse center line C1 and two edges facing each other that are perpendicular or substantially perpendicular to the transverse center line C1. The pixel electrode 191 and the cutout pattern are symmetrical with respect to the transverse center line C1 and the longitudinal center line C2.

The pixel electrode 191 according to exemplary embodiments of the present invention has a cutout pattern of various shapes that are not limited to what is shown in FIG. 10 to FIG. 14, and the cutout pattern is simple, e.g., in design or structure, compared with a cutout pattern, such as a slit formed in the pixel electrode of the conventional VA (Vertical Alignment) mode liquid crystal display. Accordingly, compared with the conventional VA mode liquid crystal display, the liquid crystal display according to an embodiment of the present invention can result in increased transmittance and a simplified manufacturing process.

When the simplified cutout pattern is formed in the pixel electrode 191, the inclination direction of the liquid crystal molecules 31 is determined by a fringe electric field generated by the cutout pattern. Further, according to the process of manufacturing a liquid crystal display described in connection with FIG. 4 to FIG. 7, the liquid crystal molecules 31 can be pre-tilted in the inclination direction by the fringe electric field.

Figure 15:
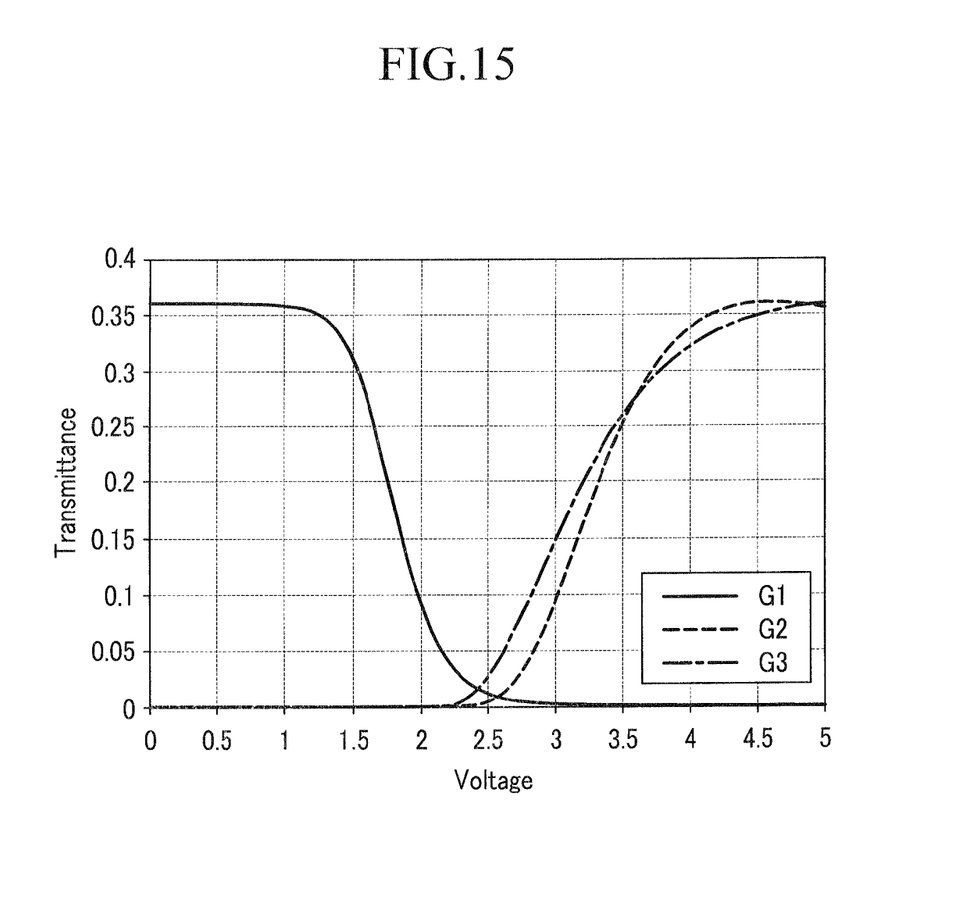
FIG. 15 is a graph illustrating transmittance of liquid crystal displays according to the conventional art and an exemplary embodiment of the present invention.

FIG. 15 is a graph illustrating transmittance of liquid crystal displays according to the conventional art and an exemplary embodiment of the present invention in a condition that the liquid crystal displays have the same cell gap in a liquid crystal layer and the same rubbing direction.

The curve G1 shows transmittance of a liquid crystal display of a conventional twist nematic mode, the curve G2 shows transmittance of a liquid crystal display according to an exemplary embodiment of the present invention, and the curve G3 shows transmittance of a liquid crystal display of a conventional vertical alignment (VA) mode. Referring to FIG. 15, the transmittance of the liquid crystal display according to an exemplary embodiment of the present invention is higher than the transmittance of the liquid crystal display of the conventional vertical alignment (VA) mode and is not lower than the transmittance of the liquid crystal display of the conventional twist nematic mode.

Further, the lowest transmittance of the liquid crystal display according to an exemplary embodiment of the present invention is lower than the lowest transmittance of the liquid crystal display of the conventional twist nematic mode such that the contrast ratio of the liquid crystal display according to an exemplary embodiment of the present invention is increased compared with the contrast ratio of the conventional twist nematic mode.

According to an embodiment, the characteristics of the above-described exemplary embodiments, for example, the characteristics of the exemplary embodiment described in connection with FIG. 8 and the exemplary embodiment described in connection with FIG. 10 to FIG. 14 are simultaneously applied to one liquid crystal display.

While the embodiments of the invention have been described, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate and a second substrate facing each other;
a plurality of first electrodes on the first substrate;
a first vertical alignment layer on the first electrode;
a second electrode on the second substrate;
a second vertical alignment layer on the second electrode; and
a liquid crystal layer between the first substrate and the second substrate,
wherein the liquid crystal layer includes liquid crystal molecules having negative dielectric anisotropy, a chiral dopant, and an alignment aiding agent,
wherein at least one of the plurality of first electrodes has a cutout pattern including at least two edges, wherein each of the at least two edges has two ends which are in contact with two different sides of the at least one of first electrodes from each other, and
wherein the at least two edges of the cutout pattern are symmetrical with respect to a transverse center line or a longitudinal center line of the first electrodes, and
wherein the cutout pattern defined by the at least two edges is continuously formed crossing the transverse center line or the longitudinal center line of the first electrode.

2. The liquid crystal display of claim 1, wherein the liquid crystal molecules are arranged to be substantially perpendicular to surfaces of the first substrate and the second substrate when no electric field is generated in the liquid crystal layer, and the liquid crystal molecules are arranged to be twisted by the chiral dopant when an electric field is generated in the liquid crystal layer.

3. The liquid crystal display of claim 1, wherein the alignment aiding agent includes at least one of a surface alignment aiding agent connected to the first vertical alignment layer and an internal alignment aiding agent that is not connected to the first vertical alignment layer nor the second vertical alignment layer.

4. The liquid crystal display of claim 3, wherein at least one of the first vertical alignment layer or the second vertical alignment layer is rubbed.

5. The liquid crystal display of claim 4, wherein a rubbing direction of the first vertical alignment layer crosses a rubbing direction of the second vertical alignment layer.

6. The liquid crystal display of claim 1, wherein at least one of the first vertical alignment layer or the second vertical alignment layer is rubbed.

7. The liquid crystal display of claim 6, wherein a rubbing direction of the first vertical alignment layer crosses a rubbing direction of the second vertical alignment layer.

8. The liquid crystal display of claim 1, wherein one of the two sides is connected at a substantially right angle to the other of the two sides.

9. The liquid crystal display of claim 1, wherein one of the two sides is in substantially parallel to the other of the two sides.

10. The liquid crystal display of claim 1, wherein the at least one of the plurality of first electrodes includes at least two first electrode portions divided by the cutout pattern, and wherein the at least one of the plurality of first electrodes further includes a connection enclosing the at least two first electrode portions and the cutout pattern.

11. A method of manufacturing a liquid crystal display, the method comprising:
providing a first substrate having a plurality of first electrodes and a second substrate including a second electrode;
forming a first vertical alignment layer on the first electrodes and a second vertical alignment layer on the second electrode;
forming a liquid crystal layer between the first and second substrates, the liquid crystal layer including liquid crystal molecules, a chiral dopant, and a prepolymer;
generating an electric field in the liquid crystal layer; and
polymerizing the prepolymer,
wherein at least one of the plurality of first electrodes has a cutout pattern including at least two edges, wherein each of the at least two edges has two ends which are in contact with two different sides of the at least one of first electrodes from each other, and
wherein the at least two edges of the cutout pattern are symmetrical with respect to a transverse center line or a longitudinal center line of the first electrodes, and
wherein the cutout pattern defined by the at least two edges is continuously formed crossing the transverse center line or the longitudinal center line of the first electrode.

12. The method of claim 11, wherein the liquid crystal molecules are arranged to be substantially perpendicular to surfaces of the first substrate and the second substrate when the electric field is not generated in the liquid crystal layer, and the liquid crystal molecules are arranged to be twisted by the chiral dopant when the electric field is generated in the liquid crystal layer.

13. The method of claim 11, wherein the prepolymer is polymerized by irradiating light to the liquid crystal layer.

14. The method of claim 11, wherein the prepolymer includes at least one of a prepolymer connected to the first vertical alignment layer and a prepolymer that is not connected to the first vertical alignment layer nor the second vertical alignment layer.

15. The method of claim 11, wherein the prepolymer includes a reactive mesogen.

16. The method of claim 15, further comprising rubbing at least one of the first vertical alignment layer or the second vertical alignment layer.

17. The method of claim 16, wherein at least one of the plurality of first electrodes has a cutout pattern including at least one edge.

18. The method of claim 11, further comprising rubbing at least one of the first vertical alignment layer or the second vertical alignment layer.

19. The method of claim 11, wherein a weight ratio of the prepolymer to the liquid crystal layer is in a range from about 0.1 wt % to about 1.0 wt %.

* * * * *